United States Patent
Carlson et al.

(10) Patent No.: US 6,779,796 B2
(45) Date of Patent: Aug. 24, 2004

(54) COMPACT DEPLOYMENT AND RETRIEVAL SYSTEM FOR A TOWED DECOY UTILIZING A SINGLE CABLE EMPLOYING FIBER OPTICS

(75) Inventors: Mark A. Carlson, Amherst, NH (US); James J. Jordan, Nashua, NH (US); John Russotti, Hudson, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/027,325

(22) Filed: Dec. 20, 2001

(65) Prior Publication Data

US 2004/0145118 A1 Jul. 29, 2004

Related U.S. Application Data

(60) Provisional application No. 60/328,603, filed on Oct. 11, 2001, provisional application No. 60/328,594, filed on Oct. 11, 2001, and provisional application No. 60/328,617, filed on Oct. 11, 2001.

(51) Int. Cl.[7] .................................................. A41J 9/10
(52) U.S. Cl. ...................................................... 273/361
(58) Field of Search ................................ 273/360, 361, 273/363; 244/1 TD

(56) References Cited

U.S. PATENT DOCUMENTS

| | | | | |
|---|---|---|---|---|
| 4,195,798 A | * | 4/1980 | Costantino et al. | 244/1 TD |
| 4,304,189 A | * | 12/1981 | Wright | 114/254 |
| 4,598,882 A | * | 7/1986 | Opdahl | 244/1 TD |
| 4,890,751 A | * | 1/1990 | Opdahl | 212/271 |
| 6,056,236 A | * | 5/2000 | Weimer et al. | 244/1 TD |
| 6,199,793 B1 | * | 3/2001 | Hainsworth et al. | 244/1 TD |
| 6,454,212 B1 | * | 9/2002 | Bartov | 244/135 A |

* cited by examiner

Primary Examiner—Mark S. Graham
(74) Attorney, Agent, or Firm—Daniel J. Long; Robert K. Tendler

(57) ABSTRACT

A decoy deployment and retrieval system includes an extensible boom and corresponding cradle or saddle for use in the retrieval of the towed decoy such that, upon retrieval, the extensible boom with its decoy captured in the cradle is retracted into a chamber so that the decoy can be deployed over and over again. In one embodiment, the decoy is both towed by, and controlled over, a fiber optic line in which a load cell is used to detect tension on the line to prevent damage, and a fiber optic rotary joint is utilized along with high voltage slip rings to permit electrical and optical coupling without backlash, fouling or damage to the line.

11 Claims, 4 Drawing Sheets

COMPACT DEPLOYMENT AND RETRIEVAL SYSTEM FOR A TOWED DECOY UTILIZING A SINGLE CABLE EMPLOYING FIBER OPTICS

REFERENCE TO RELATED APPLICATIONS

This application claims rights under 35 U.S.C. 119(e) under U.S. Provisional Applications Serial Nos. 60/328,594; 60/328,603; and 60/328,617, all filed on Oct. 11, 2001.

FIELD OF INVENTION

This invention relates to towed vehicles and more particularly to a compact system for deploying and retrieving towed decoys so that they can be redeployed multiple times.

BACKGROUND OF THE INVENTION

As will be appreciated, aerial towed objects are used for a variety of purposes, including decoys, testing, and scientific investigations. In one embodiment, these decoys are used to draw various types of guided weapons away from an aircraft that the weapons are intended to destroy. As will be appreciated, these towed targets and decoys contain various types of electronic circuits to create an apparent target to a weapon to attract the weapon to the decoy rather than the aircraft. One active electronic device used in a decoy is a traveling wave tube amplifier to which high voltages must be applied to power the traveling wave tube. Additionally, other controls for the traveling wave tube or other electronics in the towed device are transmitted in one embodiment along a fiber optic transmission line, which is both frangible and fragile.

In the typical military operation, the decoys are sacrificed, meaning that the cables that attach the decoy to the deployment canister are severed after the decoy has been used.

The practice of cutting decoys after use and using them as an expendable commodity causes multiple problems. As a result it becomes important to be able to recover the towed vehicle itself, mainly because of the cost of the towed vehicle, as well as the fact that replacing towed vehicles often is difficult due to the long lead times in the manufacturing process and provision of such decoys.

For instance, typically a towed countermeasure decoy may cost as much as $50,000 per decoy round. As many as eight decoys per sortie or mission can be deployed and as such, assuming 400 sorties per month, then the total expense of deploying expendable decoys is quite large, making the cost for the protection of the aircraft that employ these decoys excessive. Moreover, in a wartime setting, the decoy cannot be manufactured quickly enough. So bad is the situation that it may be necessary to scrounge decoys from the battlefield where they fall for reuse.

There is therefore a necessity for being able to deploy a towed decoy in such a manner that it can be powered and controlled during the countermeasure operation, while at the same time, being able to be retrieved and reused again.

In the past, attempts to deploy such decoys in a rapid manner have included a spinning reel-like spindle payout system in which the decoy is paid out behind the aircraft without the ability to winch it back in.

It will be appreciated that priorly the only airborne towed devices that were winched into the aircraft after use were sonobuoys or towed instruments deployed from helicopters in which the winching systems themselves occupied inordinate amounts of space. As such, these devices were unsuitable for combat aircraft due to the current volume constraints on tactical aircraft. Thus, due to both the size and problems with slowly winching out a towed vehicle, no such winching systems were applied to the towed decoys for combat.

It is noted that sonobuoys and pod-mounted countermeasures were typically carried in an equipment pod the size of an MK-84 aerial bomb or the ALQ-164 type electronics counter-measures pod. What will be appreciated is that these pods are exceptionally large and preclude, for instance, the carrying of armaments in the position where the pod is located. Thus the payload of any attack aircraft would be severely limited if unwieldy winching systems such as associated with sonobuoys along with the associated housing were used to deploy normal decoy rounds. Note that prior art winding systems occupied a space many times the size of the normal decoy round.

By way of further background, the types of decoys involved have included devices which countermeasure infrared guided and radar guided missiles that pose the primary threats to military aircraft engaged in a combat environment. It will be appreciated that these missiles use their radar guidance systems to get within striking distance of the aircraft, thereby substantially increasing their probability that the IR system on the missile will be able to lock onto the target.

Current military aircraft are particularly vulnerable to attack from IR-guided surface-to-air and air-to-air missiles. Statistical data of aircraft losses in hostile actions since 1980 show that almost 90 percent of these losses have been the result of IR-guided missile attacks. As a result, the ability to deploy and then recover decoys that can counter-measure the IR guidance systems on these missiles is of great value to protect aircraft during combat situations. As mentioned above, the IR-guided system initially utilizes radar guidance and then switches over to IR guidance as they come into closer proximity to the target. If one can counter-measure the radar system, then the IR portion can never lock onto the particular infrared target. To do this, the missile is deflected away by generating a signal that causes the radar guidance system in the missile to think that the target is actually elsewhere than it actually is.

In the past, the ALE-50 Towed Decoy system currently in the inventory of the US Armed Forces includes a decoy round in a canister and a reel payout mechanism. When the decoy has served its purpose, it is cut loose and the ALE-50 decoy is lost.

Moreover, the same scenario is true for the more modern ALE-55, or in fact, any type of expendable towed vehicle.

In summary, prior art decoys were intended to be sacrificed and the towline was typically cut at the aircraft at the end of flight or mission. Thus, these systems did not contemplate the winching in or reeling in of the decoy. The reason is because these decoys needed to be rapidly deployed. One rapid deployment method included a spindle that paid out the towline in much the same way as a spinning reel pays out fishing line. Although spinning reel-like techniques have existed for fishing, in the area of rapidly deployed decoys they were not used to winch decoys. Also, the spindles themselves were not necessarily driven.

As will be appreciated, there are a number of U.S. patents that in general cover towed vehicle deployment, such as U.S. Pat. Nos. 5,836,535; 5,603,470; 5,605,306; 5,570,854; 5,501,411; 5,333,814; 5,094,405; 5,102,063; 5,136,295; 4,808,999; 4,978,086; 5,029,773; 5,020,742; 3,987,746 and 5,014,997, all incorporated by reference herein. In none of these patents is the subject retrievable system shown or taught.

SUMMARY OF THE INVENTION

In order to deploy, retrieve and reuse towed decoys, in the subject system, the decoy is housed in a canister with a towline wound around a level winding winching system, which during the deployment of the decoy, winches out the decoy at a moderately high speed. In the subject system, both the high voltage electrical signals to the traveling wave tube within the decoy and the controls for the countermeasure system carried by the decoy are transmitted over an electro-optic cable into which is embedded a length of high voltage tension line to be able to power the traveling wave tube. In one embodiment, there are five lines that carry a voltage, including three at high voltage, one at low voltage and a ground. The signals to control the countermeasure device within the decoy are carried by the relatively fragile fiber optic cable, which, in one embodiment, is connected to drive circuitry through a fiber optic rotary joint, such that the decoy can be winched out and retrieved with the signals passing through the center shaft of the level winding winching system. Additionally, high voltage slip rings are utilized along with the fiber optic rotary joint such that all the necessary signals and voltages can be applied to the decoy without any twisting of lines. It will be appreciated that in winching systems where the same line is utilized which winches the decoy in and out and is utilized for signal transmission, twisting inevitably occurs, which would damage both the fiber optic cable and the high voltage transmission lines.

In the past when towed decoys were deployed in the so-called spinning reel type of environment, the amount of twist imparted to the cable itself was not sufficient to cause damage to the cables.

However, when considering a fully-winched system, it is important to consider how it is that the cables can be deployed without fracture or injury, thus to permit multiple deployments. As part of the subject invention, the feeding of the line from and to the level winding winching system is accomplished with means to prevent backlash and jamming of the line during the retrieval process, as well as damage to the line during deployment. Secondly, the tension of the line during the retrieval process is continuously monitored so that excessive loads are avoided.

Central to the subject invention is a telescoping or extensible cradle or saddle which is extended after deployment of the decoy and which is utilized to capture the retrieved decoy as it is reeled in. After the decoy has reached its captured position, the entire telescoping assembly is retracted such that the decoy and the assembly are retracted into the canister from which the decoy can be redeployed.

The result is a decoy deployment system which can be used multiple times, due to the fact that the deployed decoy is captured and stored in the original canister. Secondly, multiple deployments of the decoy do not result in damage to the single towing line such that through the utilization of the fiber optic rotary joint, high voltage slip rings and the level winder traverse mechanism, decoys can be carried on an aircraft in a space that is one-tenth the size of prior equipment pods and at the same time permits the decoy to be deployed and redeployed even during the same mission.

In summary, a decoy deployment and retrieval system includes an extensible boom and corresponding cradle or saddle for use in the retrieval of the towed decoy such that upon retrieval the extensible boom with its decoy captured in the cradle is retracted into a chamber so that the decoy can be deployed over and over again. In one embodiment, the decoy is both towed by and controlled over a fiber optic line in which a load cell is used to detect tension on the line to prevent damage, and a fiber optic rotary joint is utilized along with high voltage slip rings to permit electrical and optical coupling without backlash, fouling, or damage to the line.

BRIEF DESCRIPTION OF THE DRAWINGS

These and other features of the subject invention will be better understood in connection with the Detailed Description in conjunction with the Drawings, of which.

DETAILED DESCRIPTION

Figure 1A:
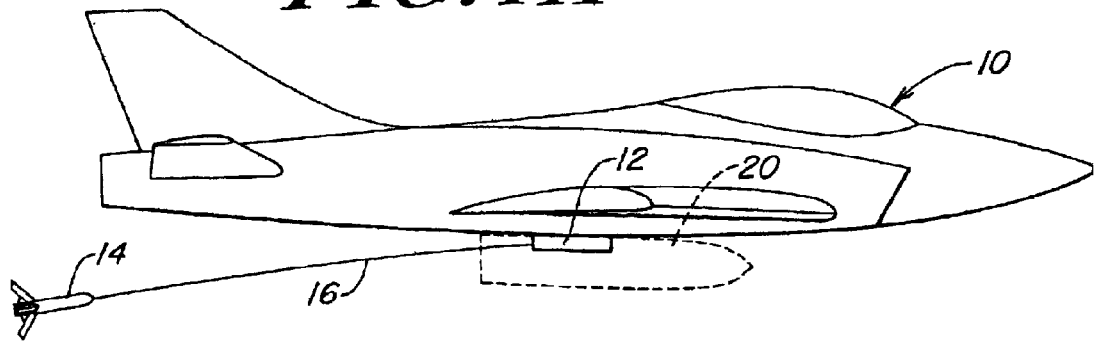
FIGS. 1A and 1B are diagrammatic representations of the deployment of a prior art decoy system, indicating the relative size of the equipment pod if used for winching and illustrating the cutting of the tow line after decoy deployment.
Figure 1B:
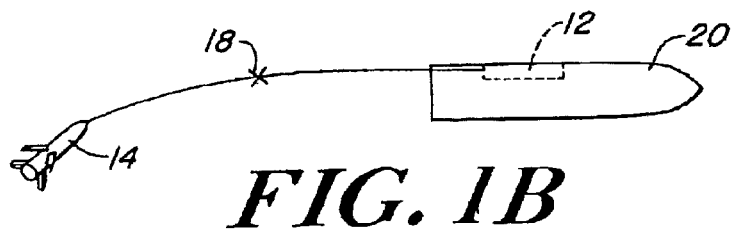

Referring to FIG. 1A, a typical attack aircraft 10 has in the past been provided with a decoy containing canister 12 from which a decoy 14 is deployed over a tow line 16. As can be seen from FIG. 1B, decoy 14 is cut loose from canister 12 after the countermeasure operation as indicated by the X, here illustrated at 18.

As has been mentioned above, these decoys were sacrificed and there was no attempt to either winch them out or winch them in. Had there been such an attempt utilizing winching systems for sonobuoys, for instance, then the pod, here illustrated by line 20, would be clearly about 10 times the size of the canister necessary for the deployment of a decoy round.

This being the case, it was important to be able to provide a compact canister for both the deployment of the decoy and for retrieval in such a manner that the decoy can be deployed multiple times even in the same mission. This would give the aircraft the ability to stay on station longer, without having to reload decoy rounds.

Figure 2:
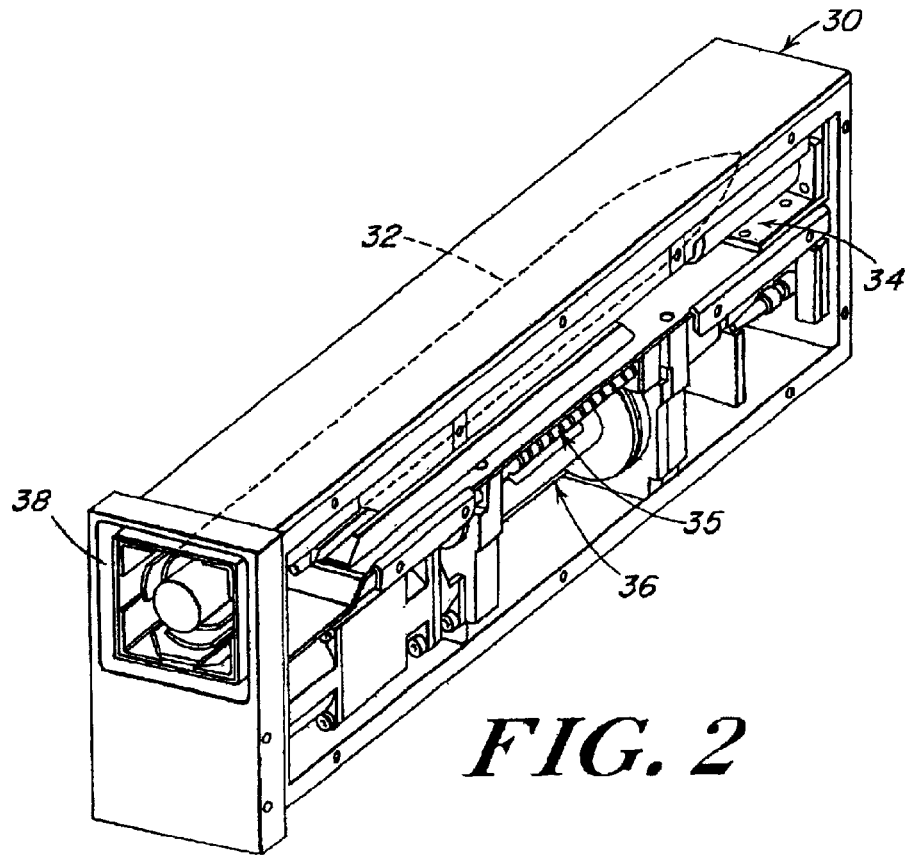
FIG. 2 is a diagrammatic illustration of the canister utilized in the deployment of the decoy round indicating the storage thereof in a canister compartment above level winding deployment and retrieval apparatus.

In the subject invention and referring now to FIG. 2, a canister 30 is illustrated as housing a decoy round 32, shown in dotted outline, within a chamber 34 that lies above a level winding deployment and retraction system 36. As can be seen, canister 30 has a framed aperture 38 through which the decoy round is deployed from whence it streams aft of the aircraft with a single tow line emanating from this aperture frame.

Figure 3:
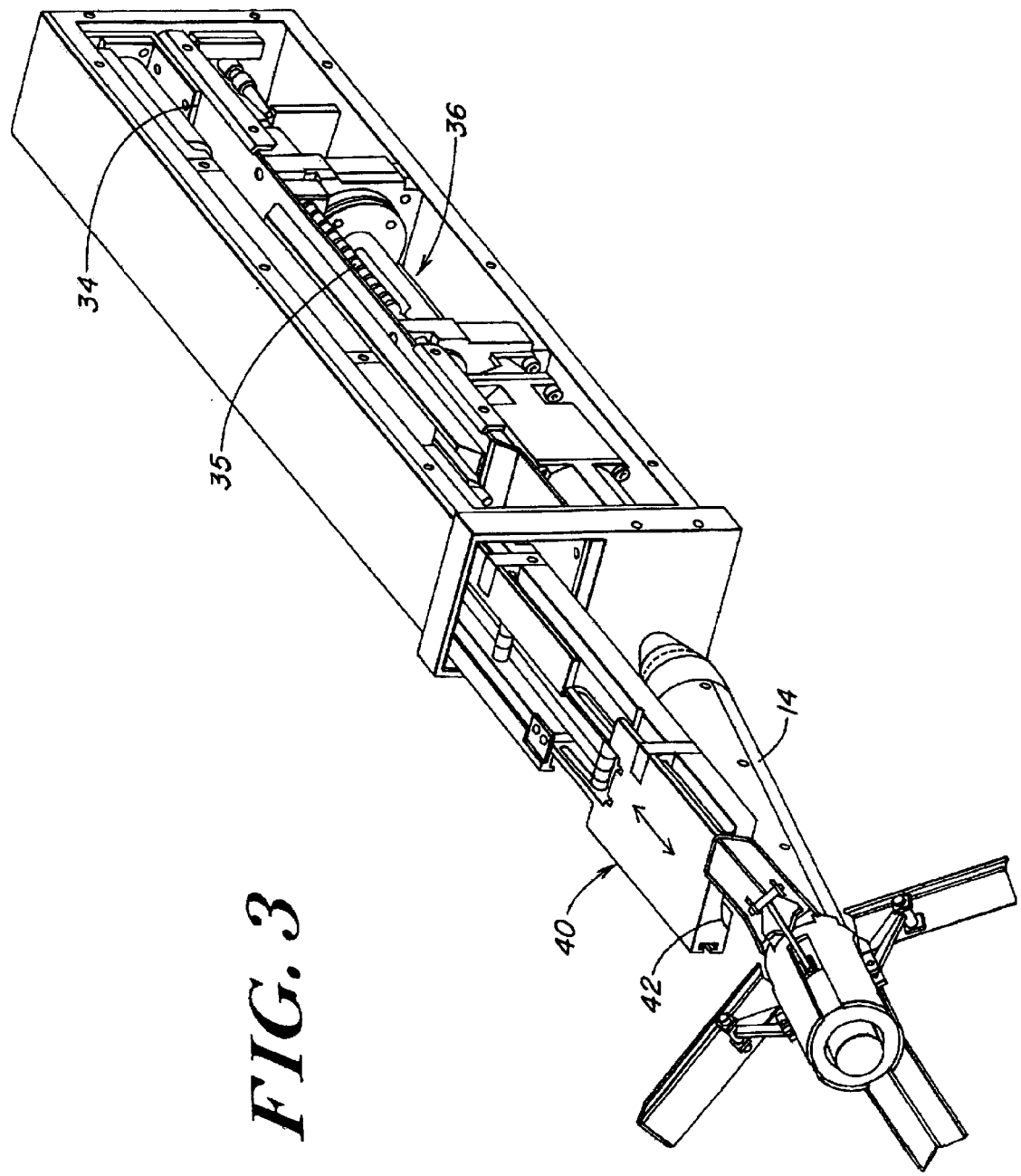
FIG. 3 is a diagrammatic illustration of the canister of FIG. 2, illustrating the deployment of the telescoping boom or saddle for retrieving the decoy once deployed, showing the capture of the decoy in the cradle or saddle prior to the retraction of the boom and the decoy into the canister.

Referring now to FIG. 3, during the retrieval process, an extensible boom 40 includes a decoy capture channel 42 which serves as a saddle or cradle for the decoy when it is reeled in via level winding system 36.

It is important to note that the boom is extended during the retrieval process so as to permit the capture of the deployed decoy as the decoy is reeled in. After the decoy is firmly secured to the saddle, the boom and decoy are retracted into chamber 34 by virtue of the winding up of the single towline that is utilized. This is accomplished by the electric drive and lead screw 35 in FIGS. 2 and 3.

It is important during the deployment process that the decoy be released at a moderately high speed, however controlled. It has been found that absent any kind of braking in prior art systems the single towline could break during deployment. It is for this reason that level winding apparatus 36 is utilized as a brake in the controlled payout of the towline to prevent wild gyrations of the decoy during deployment.

This same level winding system is utilized in the retrieval of the decoy, with the level winding mechanism assuring that the line as it is both paid out and reeled in does so over a driven spindle in such a manner as to eliminate backlash, kinking and other types of jamming, which would cause the severing or damage to the single tow line.

Figure 4:
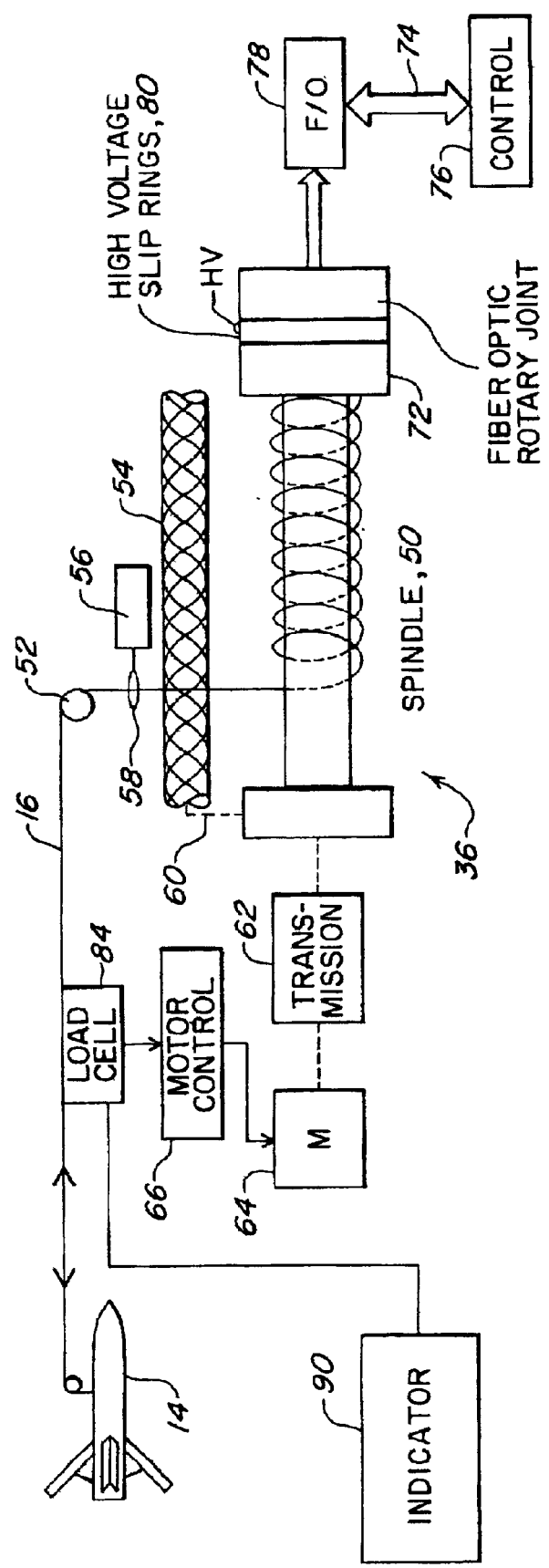
FIG. 4 is a schematic diagram of the deployment of the decoy in the system of FIGS. 1 and 2, in which a level winding spindle is shown driven through a transmission via motor under the control of a motor control unit which is in turn responsive to a load sensor that senses the tension on the tow line, also illustrating the utilization of a fiber optic rotary joint and a high voltage slip ring assembly; and, FIG. 5 is a diagrammatic and schematic representation of the retrieval process shown in FIG. 3, indicating the utilization of a load cell and a spring-loaded sheave in the capture of the decoy, along with the drive for the telescoping boom.

Referring now to FIG. 4, a spindle 50 is shown diagrammatically to carry towline 16, which is passed over a number of sheaves, here diagrammatically illustrated at 52. A double helix rotating shaft 54 rotates at a predetermined speed and a traversing wire guide carrier 56 having an eyelet loop or other guiding mechanism 58 guides line 16 backwards and forwards over the rotating spindle 50. As can be seen by dotted line 60, the rotating helically grooved shaft 54 is mechanically coupled to the spindle such that the winding pitch is mechanically controlled regardless of the speed with which the spindle is rotating. Here it can be seen that spindle 50 is coupled through a transmission 62 to a motor 64 under the control of a motor control unit 66 so that the rate at which the tow line is paid out is controlled, as well as the rate of retrieval.

In order to provide the appropriate connections to the rather fragile single tow cable, a fiber optic rotary joint 70 is employed at the distal end 72 of spindle 50 such that signals 74 from a control unit 76 are passed through a fiber optic coupler 78 so as to be able to control the traveling wave tube in towed decoy 14. Also attached in the vicinity of the fiber optic rotary joint are high voltage slip rings, here diagrammatically illustrated at 80 to provide the appropriate power to the electronic apparatus in decoy 14.

It will be appreciated that there are several fiber optic rotary joints available commercially, such as those manufactured by Focal Technologies Corp. of Nova Scotia, Canada and Litten Polyscientific of Blacksburg, Va.

It will also be appreciated that level winding apparatus is known and commercial available level winders are provided by Norco Inc. of Ridgefield, Conn.

Of particular importance in the subject system is a load cell 84 which is utilized to monitor the tension in line 16, especially during the retrieval process, but also during deployment. The purpose of the utilization of load cell 84, which is seen coupled to motor control unit 66, is to permit the driving of spindle 50 in such a manner to eliminate overly high rates of retrieval or deployment under high loads.

It will be appreciated that in certain operational situations, it is important to be able to pre-deploy a decoy and for this purpose a moderately slow deployed decoy is appropriate. In this case, the subject system is utilized to pre-deploy the decoy, with load cell 84 providing information to the pilot via indicator 90 in case a certain tension has been exceeded. It may then be appropriate for the pilot to know that excessive tension exists and that it would either be impossible to reel in the decoy or that the motor utilized may fuse due to the overheating associated with high tensions. Indicator 90 may therefore give the pilot the option to slow down the aircraft to a point at which the level winding mechanism and associated motor can be used effectively to reel in the decoy, or a decision can be made to sacrifice the decoy in those cases where it would be inappropriate to slow down the aircraft.

Figure 5:
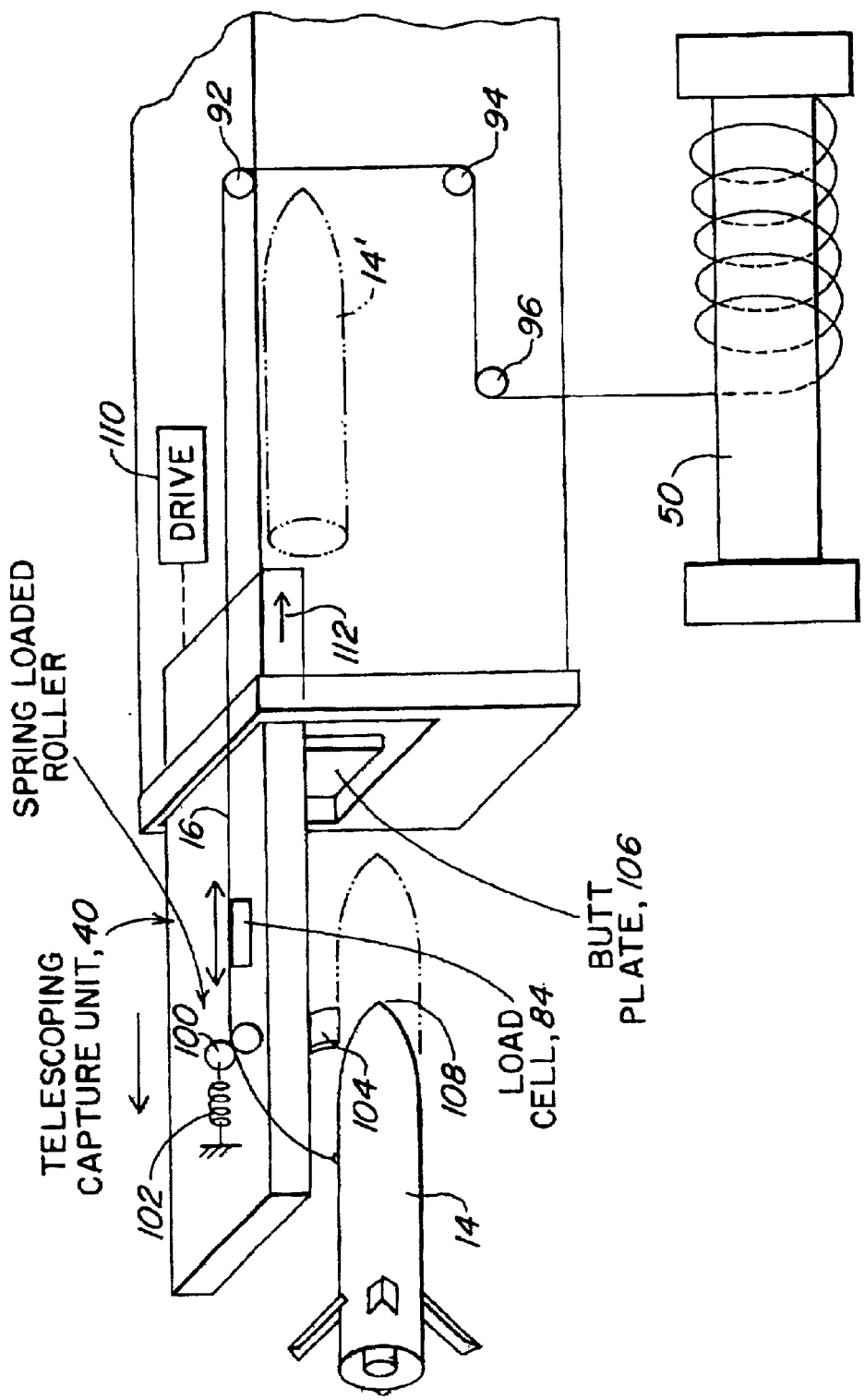

Referring now to FIG. 5, in one embodiment the telescoping capture unit, here illustrated as boom 40, is provided with load cell 84, which is in the path of line 16 as it goes over sheaves or pulleys 92, 94 and 96 onto spindle 50 as described above. Here will be appreciated that line 16 goes over a sheave 100, which is spring-loaded at 102 and then over the load cell so that its tension can be ascertained.

The purpose of the spring-loaded sheave is to provide necessary compliance during the decoy docking operations.

In this figure, it will be seen that the retrieved decoy 14 is carried in a saddle 104 with unit 40 being provided with a butt plate 106 so that as the decoy is reeled in, its nose 108 butts against the surface of butt plate 106, thereby to effectuate capture. As illustrated at 110, the telescoping capture unit 40 is driven by a drive 110 such that it moves in the direction of arrow 112 until such time that it and the retrieved decoy are in the stowed position indicated by dotted line 14 prime.

It will be appreciated that in one embodiment, the telescoping capture unit 40 is deployed only when the decoy is within a predetermined distance of the canister. Since the towline 16 in any event goes over and through sheaves or pulleys carried by the boom, in order to eliminate excessive damage to the telescoping member due to the whipping around of the decoy, it is only when the decoy, for instance, is within a couple feet of the canister that the telescoping capture unit is deployed. This can be sensed in a number of ways, one way being to know how much of the line has been reeled in. Other ways include optical sensors or other physical proximity sensors.

What has therefore been provided is a system for deploying decoys in which the decoy can be retrieved and deployed multiple times even within one mission, thereby eliminating the wastage associated with sacrificial units. The utilization of a fiber optic rotary joint and high voltage slip rings eliminates the possibility of fouling, jamming or backlash along with the utilization of a co-driven, double helix, traversing wire guide. The result is that decoys can be flown with a single tow wire thereby limiting the complexity of the towing system. Additionally, fiber optic communications can be utilized without fear of the destruction of the fiber optic cable during deployment or retrieval.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A decoy deployment and retrieval system for a decoy tethered by a towing cable including an fiber optic cable, comprising:

a fiber optic towing cable;

a canister for housing and deploying said decoy, said canister including an extensible boom having a cradle for capturing said decoy upon retrieval and translatable from a stowed position to a decoy retrieval position;

a level winding winch located in said canister for reeling in a deployed decoy by said fiber optic towing cable for capture by said cradle for preventing damage to said fiber optic cable; and, an actuator for extending said boom during retrieval and for withdrawing said boom to said stowed position after capture of said deployed decoy, whereby said decoy is restored for redeployment within said canister.

2. The system of claim 1, and further including a fiber optic rotary coupler adjacent said winch, said coupler having one portion thereof coupled to an end of said fiber optic cable and rotatable with said winch, and another portion fixed to said canister such that signals may be placed on and received from said fiber optic cable from said canister without twisting said fiber optic cable.

3. The system of claim 1, wherein said decoy includes a traveling wave tube and wherein said towing cable includes at least one high voltage line for powering said traveling wave tube.

4. The system of claim 3, and further including a high voltage slip ring assembly adjacent said winch and having the ring thereof rotatable with said winch and coupled to said high voltage line and another ring thereof fixed to said canister.

5. The system of claim 1, wherein said towing cable runs over said boom and further including a load sensor in said boom and in contact with said cable for detecting the load thereon.

6. The system of claim 5, wherein said winch includes a motor and a control unit coupled thereto, and further including means for coupling said load sensor to said control unit, said control unit controlling the winching speed of said winch so as to keep the load on said cable below a predetermined maximum to prevent damage to said cable.

7. The system of claim 5, and further including a tension indicator coupled to said load sensor and an indicator actuator for activating said indicator when the tension sensed by said load sensor is above a predetermined threshold.

8. A decoy deployment and retrieval system for a decoy tethered by a fiber optic towing cable including a fiber optic cable, comprising:

a fiber optic towing cable;

a canister for housing and deploying said decoy;

a level winding winching system having a spindle about which said cable is wrapped used to prevent damage to said fiber optic cable; and, a drive coupled to said spindle for actuating said winch for paying out said fiber optic cable during decoy deployment and for reeling in said decoy during retrieval, said level winding winching system operative to pay out line at a controlled rate and for reeling in said line in a backlash free manner so as not to destroy said cable.

9. The system of claim 8, said winching system includes a motor and a control therefor, and further including a load sensor in contact with said cable and coupled to said control such that tension sensed by said load cell is used in the control of the speed of said motor.

10. The system of claim 8, wherein said fiber optic cable includes a fiber optic rotary coupling at said winch, one portion of said rotary coupling coupled to said fiber optic cable and another portion of said rotary coupling coupled to said canister, whereby line fouling is avoided during winch operation.

11. The system of claim 8, wherein said fiber optic cable includes one line carrying a high voltage and further including a high voltage slip ring assembly at said winch having one ring thereof coupled to the line carrying said high voltage and another ring fixed to said canister, whereby line fouling is avoided during winch operation.

* * * * *